United States Patent [19]

Allonen

[11] Patent Number: 5,703,574
[45] Date of Patent: Dec. 30, 1997

[54] METHOD AND DEVICE FOR TRANSFERRING A MEASUREMENT SIGNAL FROM A REVOLVING ROLL USED IN A PAPER MAKING MACHINE

[75] Inventor: Harri Allonen, Jyväskylä, Finland

[73] Assignee: Valmet Corporation, Helsinki, Finland

[21] Appl. No.: 213,105

[22] Filed: Mar. 14, 1994

[30] Foreign Application Priority Data

Mar. 17, 1993 [FI] Finland ................... 931192

[51] Int. Cl.$^6$ ........................ G01S 13/75
[52] U.S. Cl. ............... 340/870.07; 340/870.19; 340/870.18; 342/42; 342/51
[58] Field of Search ............ 340/870.18, 870.16, 340/870.05, 870.07, 870.19; 73/862.55; 100/50; 162/198; 342/42, 51

[56] References Cited

U.S. PATENT DOCUMENTS

| | | | |
|---|---|---|---|
| 4,062,005 | 12/1977 | Freed | 340/870.18 |
| 4,328,494 | 5/1982 | Goodall | 340/870.18 |
| 4,399,440 | 8/1983 | Douglas | 340/870.18 |
| 4,403,218 | 9/1983 | Beal | 340/870.18 |
| 4,730,183 | 3/1988 | Crowe | 340/870.16 |
| 4,791,863 | 12/1988 | Vahatalo | 100/35 |
| 4,827,395 | 5/1989 | Anders | 764/138 |
| 4,883,233 | 11/1989 | Saukkonen et al. | 242/66 |
| 4,921,183 | 5/1990 | Saukkonen et al. | 242/66 |
| 5,043,046 | 8/1991 | Laapotti | 162/358 |

FOREIGN PATENT DOCUMENTS

| | | |
|---|---|---|
| 924138 | 9/1992 | Finland . |
| 914829 | 4/1993 | Finland . |
| 9113337 | 9/1991 | WIPO . |

OTHER PUBLICATIONS

J. Koriseva, T. Kiema and M. Tervonen, "Soft Calender Nip:An Interseting Subject For Research and Measurement", Paperi ju Paa (Paper and Timber, vol. 73 (1991), No. 5.

*Primary Examiner*—Jeffery Hofsass
*Assistant Examiner*—Albert K. Wong
*Attorney, Agent, or Firm*—Steinberg, Raskin & Davidson, P.C.

[57] ABSTRACT

A method and device for transferring a measurement signal from a revolving roll used in a paper making machine, in which detectors are arranged in the transverse direction of the roll, preferably uniformly spaced. Measurement signals generated by the detectors are passed to a measurement signal reading unit for reading the measurement of the detectors which is installed preferably at the end of the roll. From the measurement signal reading unit, the signals are transmitted wirelessly further as telemeter signals to a reading unit which is placed outside the roll and connected to a PC or equivalent computer. In the measurement signal reading unit for reading the measurement of the detectors, a transponder is arranged into which an unique code is coded for each detector. The signals are processed in the entire measurement process as analog signals. In the transfer of the telemeter signals between the unit for reading and measurement of the detectors and the reading unit placed outside the roll, a substantially low transfer frequency of an order of from about 100 kHz to about 150 kHz is employed.

20 Claims, 4 Drawing Sheets

METHOD AND DEVICE FOR TRANSFERRING A MEASUREMENT SIGNAL FROM A REVOLVING ROLL USED IN A PAPER MAKING MACHINE

BACKGROUND OF THE INVENTION

The present invention relates to a method for transferring a measurement signal from a revolving roll used in a paper making machine, in which detectors are arranged in the roll. The detectors are preferably uniformly spaced over a desired width of the roll in a transverse direction thereof. Measurement signals received from the detectors are passed to a measurement signal reading unit for reading and measuring the measurements signals generated by the detectors. The measurement unit is preferably installed at one end of the roll and transmits signals wirelessly as telemeter signals to a transponder reading unit which is placed outside the roll and is connected to a control unit, e.g., a PC or to an equivalent computer.

The present invention also relates to a device for transferring measurement signals from a revolving roll used in a paper making machine. The device comprises detectors arranged in connection with the roll, and which are preferably uniformly spaced in the transverse direction of the roll. A measurement signal reading unit for reading measurement signals generated by the detectors is preferably installed at an end of the roll. Signals received from the measurement detectors are passed to the measurement unit. The device further includes a reading unit placed outside and exterior to the roll. The measurement signal reading unit for reading measurement signals from the detectors is arranged to transfer the measurement signals to the outside reading unit as telemeter signals, as well as a PC or an equivalent computer unit which is connected to the reading unit.

In a number of different stages in the manufacture of paper, various nips are used through which the paper web is passed. Examples of such nips include roll nips and so-called extended nips in the dewatering presses in a paper machine, calendaring nips, and the nips in paper reels. The transverse distribution of the nip pressure in a dewatering press, i.e., the distribution of the nip pressure in the axial direction of the nip rolls, affects the transverse moisture profile of the web that is being pressed.

In the prior art, it is possible to use adjustable-crown rolls or variable-crown rolls (so-called Kusters rolls) as the press rolls. Transverse distribution of the linear load in the press nip can be controlled by means of hydraulic loading members (in adjustable-crown rolls) or by means of a chamber or a series of chambers pressurized by means of hydraulic fluid (in variable-crown rolls). The hydraulic loading members that are used in adjustable-crown rolls are usually regulated on the basis of regulation signals given by moisture and/or grammage detectors. However, in view of overall control and regulation of the process, it would also be extremely important to determine and ascertain the factual values and distributions of the nip pressure both in the transverse direction and in the machine direction. An additional piece of information which is important in view of the control of the nip process is the width of the nip in the running direction of the web, i.e., in the machine direction, on whose basis it is possible to optimize the pressing process. This information is also a significant factor in the regulation of the calender and reel nips. As an exemplifying embodiment of a system of regulation of press nips, reference is made to the assignee's Finnish Patent No. 76,872 (corresponding to U.S. Pat. No. 4,791,863, the specification of which is hereby incorporated by reference herein). A measurement system similar to the present invention may be used in the environment of the sort described in this reference.

Recently, various so-called extended-nip presses based on press shoes and/or on press bands have been introduced. In these extended nips, the width of the press zone in the machine direction is substantially larger than in roll nips proper. Also in extended-nip presses, the distribution of the nip pressure in the shoe and/or band nips both in the machine direction and in the transverse direction is an important parameter in view of the control of the pressing process. As an example with respect to extended-nip presses, reference is made to the assignee's Finnish Patent No. 82,092 (corresponding to U.S. Pat. No. 5,043,046, the specification of which is hereby incorporated by reference herein).

In the prior art, various drum reels are known, in which, besides the reel drums, belt-support units have also been used. When reeling a paper web, it is also important to know the values of the nip pressure and its distributions both in the machine direction and in the transverse direction. As some examples of the reels that have been developed by the assignee, in connection with which it is possible to use the method and the device of the present invention, reference is made to the assignee's Finnish Patent Nos. 81,768 and 81,770 (corresponding to U.S. Pat. Nos. 4,921,183 and 4,883,233, respectively, the specifications of which are hereby incorporated by reference herein).

By means of the prior art methods and devices, it has been practically almost impossible to measure the distribution of the nip force both in the machine direction and in the transverse direction during production operation. However, this distribution is important in view of the regulation and control of the paper making process. Measurement of the nip forces from a revolving roll has been carried out under laboratory conditions, in which respect reference is made to the paper in the journal Paperi ja Puu —Paper and Timber 73 (1991): 5, by J. Koriseva, T. Kiema and M. Tervonen: "Soft Calender Nip: an Interesting Subject for Research and Measurement". In the method described in this paper, a number of detectors are installed on the roll, each of which detectors requires a telemetric equipment of its own and amplifiers of its own. Since the weight of the measurement system mainly consists of the weight of the telemetric equipment (about 1 kilogram per channel), this, together with the high cost of such equipment, sets a limit on the number of measurement channels and detectors in a roll of a factual paper machine or a paper finishing machine. Moreover, owing to the limited space, it is very difficult to install a large number of telemetric equipments on a revolving roll in a paper machine or finishing machine without changes in the construction of the machines.

With respect to the prior art related to the present invention, reference is also made to published International Patent Application No. WO 91/13337 (in the name of Beloit Corp.).

In the prior art methods and devices for measuring nip forces, problems have also been encountered in the calibration of the detectors and in the transfer of the signal from a revolving roll. In the prior art, for the transfer of the signal, glide rings and similar arrangements have been used, and also telemetric equipments. However, it is a drawback that such arrangements are complicated and susceptible to interference.

In order to eliminate the drawbacks of the prior art methods and device described above, in the assignee's Finnish Patent Application No. 914829 (corresponding to published Finnish Patent No. 86,771 and U.S. Ser. No. 07/960,725 issued as U.S. Pat. No. 5,383,371, the specification of which is hereby incorporated by reference herein), a method and device closely related to the present invention are described in which the measurement signals received from the different detectors are passed to a switching unit. Connectors in the switching unit are controlled based on the rotation of the roll, or equivalent, by means of a pulse generator or equivalent so that, through the switching unit, the signal of each measurement detector is alternatingly connected to a telemeter transmitter placed in connection with the revolving roll or equivalent. By means of the telemeter transmitter, the series of measurement signals are transmitted wirelessly to a stationary telemeter receiver placed outside the revolving roll or equivalent.

One of the objects of the invention described in Finnish Patent Application No. 914829 is to provide a method and a device for measurement of the nip forces and nip pressures and the distribution of the same in roll and/or band nips that are used in the manufacture of paper so that the drawbacks discussed above can be substantially avoided. The measurement method and device of FI 914829 is suitable for on-line measurement of nip forces and/or nip pressures during production operation, and the transfer of signals from the revolving roll is solved in a simpler and more economical way so that the method is suitable for an environment of paper manufacture, which environment is quite demanding in this respect. Further, in the method and device of FI 914829, the problems related to the placing of the detectors on a nip roll and/or on a nip band are substantially solved.

Even though the prior art methods and devices described above have proved quite good and operable in comparison with earlier systems, some unsolved problems have however remained. One particular problem consists of the high frequencies employed in the transfer of signals from the detectors to the measuring and reading units. Owing to the high frequencies, the signal transfer distance may have to be quite long, but the long transfer distance results in a relatively high susceptibility to interference. In the earlier telemeter systems, the signal to be transmitted was already converted to digital form at the roll-side end, the signal being then transferred in the digital form (see, e.g., the assignee's Finnish Patent Application No. 924138 of earlier date). Such a system has required a relatively high number of complex electronic components which are arranged on the roll. This has the consequence of the construction of the equipment having a large size and high weight, frequently even a few hundred grams, for which reason the roll has to be balanced separately for this purpose. Further, the prior art systems of have involved the problem related to the calibration of the measurement detectors. In the earlier systems, viz., the computer connected with the system, such as a PC or equivalent, had to include an extensive and complex calibration program, which in most cases was tailored for the specific case, in order that it was possible to calibrate the detectors. The special required tailoring of a program also constitutes an important cost factor.

OBJECTS AND SUMMARY OF THE INVENTION

Accordingly, it is an object of the present invention to provide a method and device more advanced than the methods and devices described in the assignee's Finnish Patent Applications of earlier dates (Nos. 914829 and 924138), so that, compared with the methods and device of these earlier patent applications, the method and device of the present invention are simpler, easier to operate, more reliable in operation, and more versatile. In particular with respect to the electronics, in the present invention, attempts have been made to provide an embodiment that is simpler and also involves lower costs in comparison with the assignee's earlier inventions.

It is a further object of the present invention to provide a new and improved measurement system that can be controlled in a simple way during operation of the machine from outside the revolving roll so that, if necessary, measurement data and calibration data can be supplied to the measurement system from outside the roll and measurement data can be transferred from the roll wirelessly to the outside system in this manner, it is favorably possible to feed the measurement data into the regulation system of the roll so that, in some cases, a closed regulation circuit can be formed.

It is another object of the present invention to provide a new and improved method and device for transferring measurement signals from detectors arranged on a roll to a remote control unit in which a low transfer frequency is used.

In view of achieving the objects stated above and others, in the method in accordance with the present invention, a transponder is arranged in a measurement signal reading unit which reads and processes the measurements signal generated by the detectors. The transponder is provided with a code representing each of the detectors. Signals from the detectors are processed in the entire measurement process as analog signals. During the transfer of the telemeter signals between the measurement signal reading unit for reading the measurements of the detectors and a transponder reading unit placed outside the roll, a substantially low transfer frequency of an order of from about 100 kHz to about 150 kHz is employed.

The device in accordance with the present invention comprises a transponder in itself known which is coded and arranged in the unit for reading and measurement of the detectors. The transponder comprises means to process the signals received from the measurement detectors as analog signals, and in pulse form, the signals being transmitted in pulse form from the transponder to an antenna of the transponder reading unit situated exterior to the roll. The frequency of transfer of the telemeter signals between the measurement signal reading unit for reading the measurements of the detectors and the transponder reading unit placed outside the roll is arranged to be substantially low, e.g., of an order of from about 100 kHz to about 150 kHz. The transponder comprise means to transmit the telemeter signals at these low frequencies. Although the specified range of frequencies is preferred, other transfer frequencies may also be used in connection with the transponder herein.

By means of the present invention, compared with the prior art devices, a number of advantages are obtained, of which the following advantages are expressly stated. Compared with the prior art, the components included in the system of the present invention are very small and have a low weight so that they can also be fitted easily at the roll-side end without having to balance the roll on their account. The power requirement of the system is very little. The supply of current can be accomplished by means of a very small battery because the system is not active all the same time. The system is not activated until a separate command for this purpose is given from the receiving end, i.e., the reading unit or the control means via the reading unit. The measurement unit otherwise remains in a passive state conserving electricity.

The measurement signal is transferred in the system in accordance with the present invention as an analog signal and at a very low frequency (the transfer frequency is of an order of from about 100 kHz to about 150 kHz, preferably 130 about kHz). The signal to be transferred is FSK-modulated (FSK=Frequency Shift Keying), in which case the transfer of the signal takes place as an analog signal and in pulse form. By means of this arrangement, the transfer of information can be made substantially free of interference. When the signal is converted to pulse form in the measurement unit, any interference can be easily filtered out, in which case it is possible to read the main frequency alone.

In the system in accordance with the present invention, at the roll-side end, a transponder is used, one of whose advantages over the earlier systems is the ease of calibration of the detectors. This is based on the fact that, in the transponder, it is possible to assign an individual and unique code for each detector, by means of which code it is then simple to compare the calibration of each detector. The possibility of coding also simplifies and facilitates the use of the system, by means of the computer or other control means, such as a PC (personal computer) or equivalent, connected to the system. Through the read/write unit of the transponder, it is possible to give the transponder a command to read a detector of a certain code alone. As the detectors in the system, it is possible to use PVDF-type film detectors or, for example, strain gauges or equivalent.

Further advantages and characteristic features of the invention will come out from the following detailed description of the invention.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
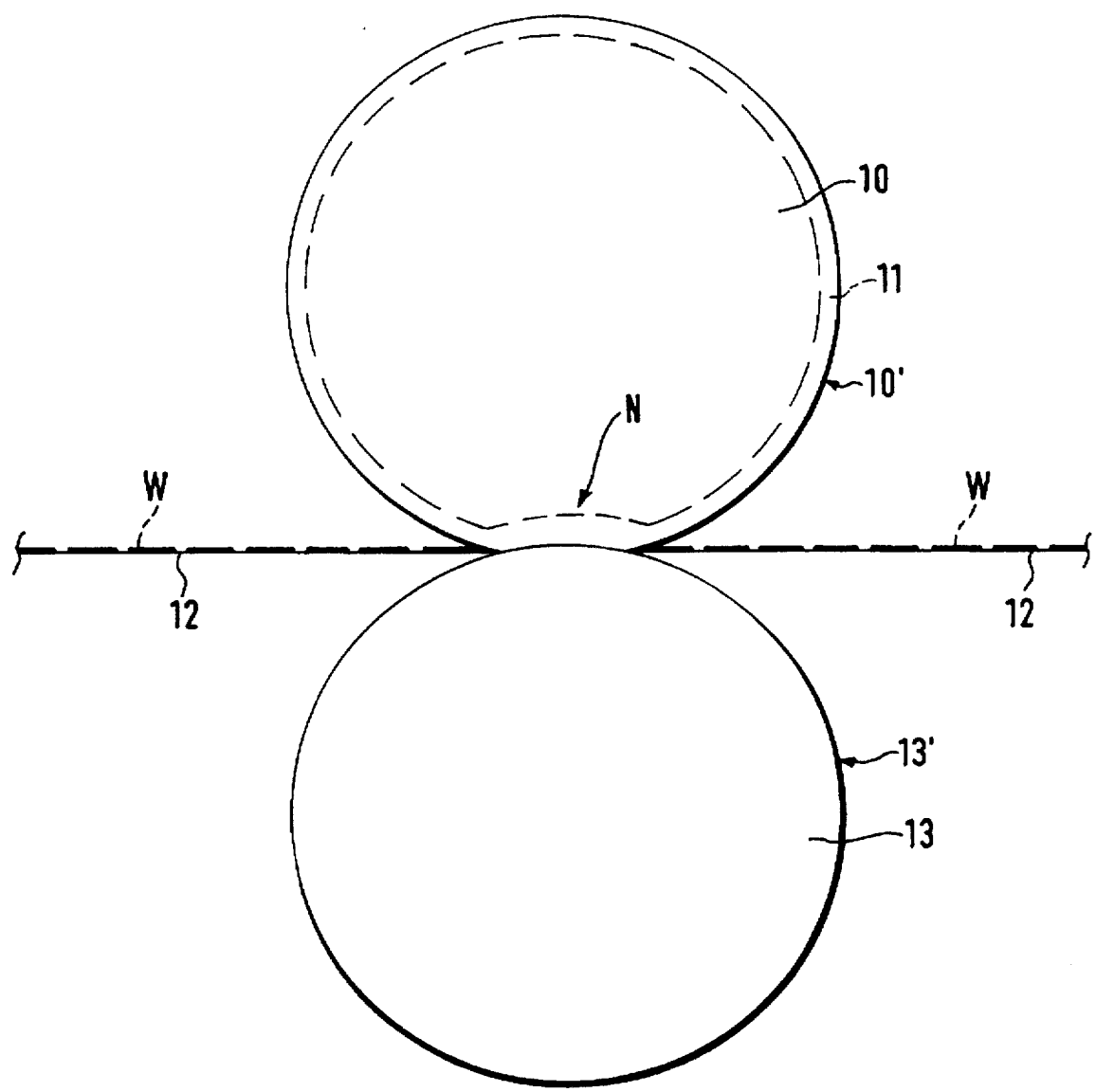
FIG. 1 is a schematic side view of a press nip to which the method and device equipment in accordance with the present invention are applied.

Referring to the accompanying drawings wherein like reference numerals refer to the same elements, FIG. 1 is a schematic side view of a press nip N in a dewatering press of a paper machine. The nip N is formed between the rolls 10 and 13. In the press nip N, water is removed out of a web W which is passed into the nip N on support of a press felt 12. The upper roll, roll 10, in the dewatering press has a smooth outer face 10' and is provided with an elastic coating 11. Onto the lower roll, roll 13, in the dewatering nip, a hollow face 13' has been formed, into which water can be removed out of the press felt 12.

Figure 2:
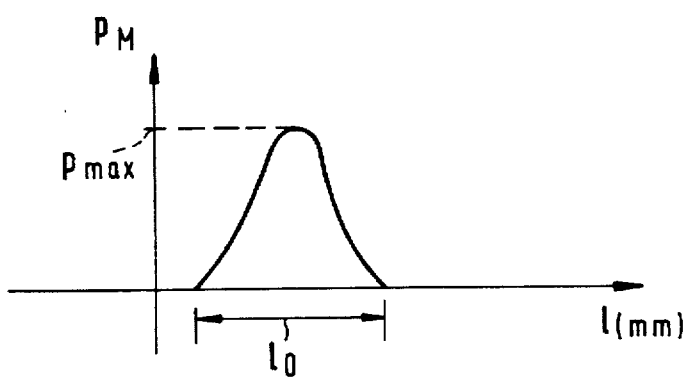
FIG. 2 is a schematic illustration of the distribution of the compression pressure in the machine direction in a press nip as shown in FIG. 1.

FIG. 2 is a schematic illustration of the distribution of the compression pressure $P_M$ in the press nip N in the machine direction 1. The maximum value of the compression pressure $P_M$ is denoted by the reference $P_{max}$. The nip N as shown in FIG. 1 may also represent a calendaring nip, in which case a press felt 12 is not used and in which case, e.g., the roll 13 is a hard-faced roll and the roll 10 is a calendaring roll provided with a soft coating, such as a polyurethane coating 11, so that the nip N is a so-called soft calendaring nip.

Figure 3:
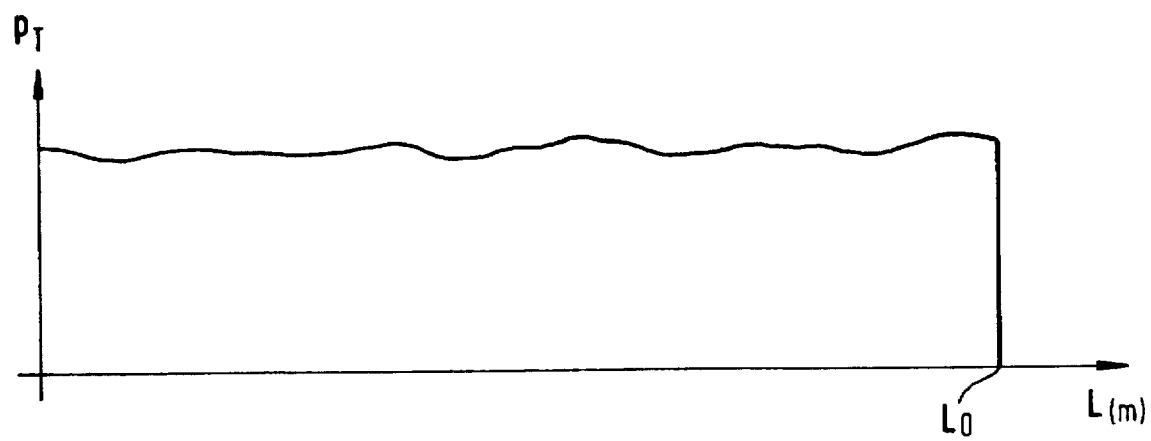
FIG. 3 is a schematic illustration of the distribution of the compression pressure in the transverse direction in a press nip as shown in FIG. 1.

FIG. 3 illustrates schematically the distribution of the compression pressure $P_T$ in the nip N in the transverse direction, i.e., in the axial direction of the rolls 10 and 13. The transverse width of the paper web W and of the nip N is denoted by reference $L_O$. The transverse distribution of the compression pressure $P_T$ affects the dry solids content of the web in dewatering nips, the caliper and smoothness of the web in calendaring nips, and the uniformity and the hardness profile of the reel in reeling nips. These are important process quantities, so that the distributions $P_M$ and $P_T$ of the nip forces and nip pressures are important parameters for the regulation and control of the paper making process.

Figure 4:
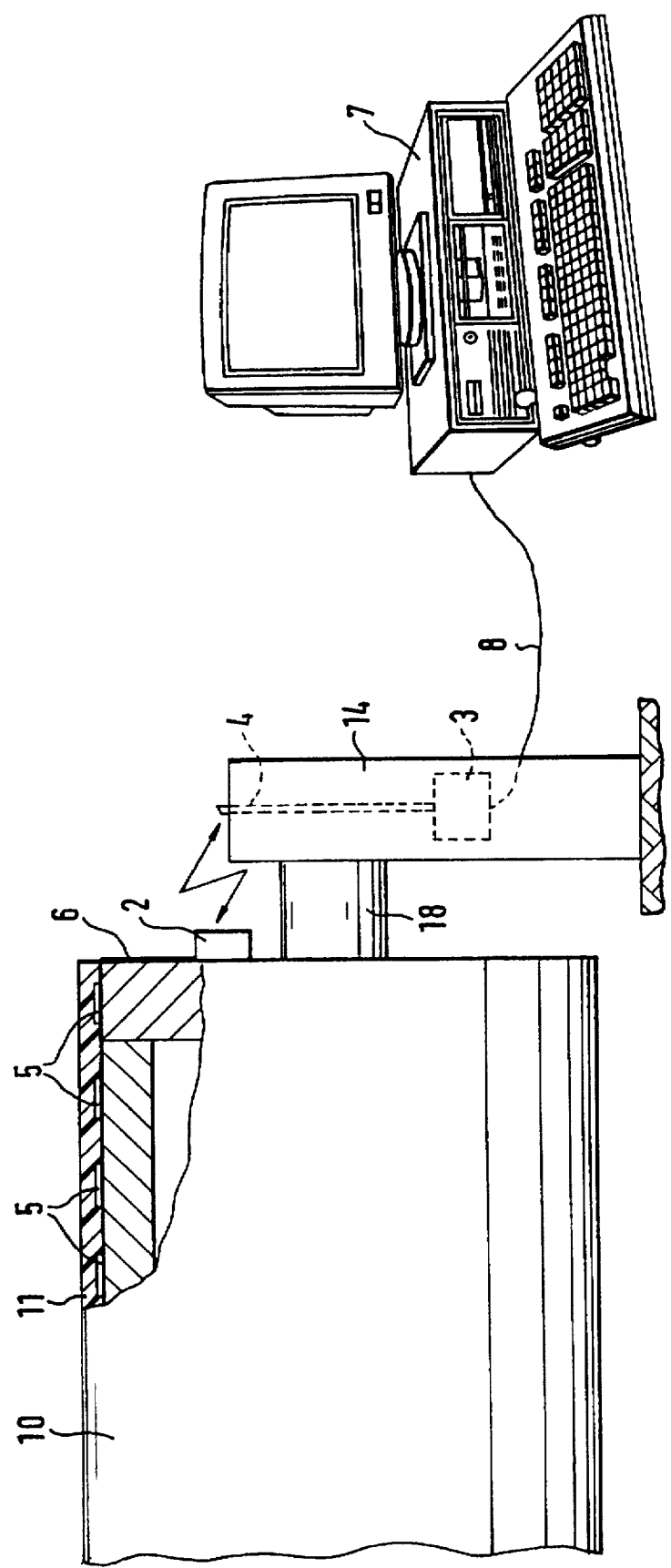
FIG. 4 is a schematic illustration of a measurement arrangement in accordance with the present invention as applied, e.g., to a nip roll in the press nip shown in FIG. 1.

FIG. 4 is a schematic illustration of the main principles of the measurement arrangement in accordance with the present invention as applied to one of the rolls 10 that form the press nip, the roll 20 being provided with an elastic coating 11, e.g., of polyurethane. A number of measurement detectors 5 are arranged inside the coating 11, and are preferably arranged to be uniformly spaced in the axial direction of the roll. By means of such a series of detectors 5 arranged at different circumferential positions on the roll, it is possible to measure both the distribution $P_M$ of the nip pressure in the machine direction and the transverse distribution $P_T$ of the nip pressure. The transverse nip pressure is measured at the points corresponding to the number of the detectors 5 in the transverse direction. The detectors 5 may be attached either directly to the body of the roll 10 or may be inlaid into the coating 11, e.g., between different layers in the coating. In some particular cases, it is possible to arrange the detectors 5 directly on the outer face of the roll. The detectors 5 may also be arranged in several positions along the circumference of the roll to provide measurements in the machine direction of the roll.

Figure 5:
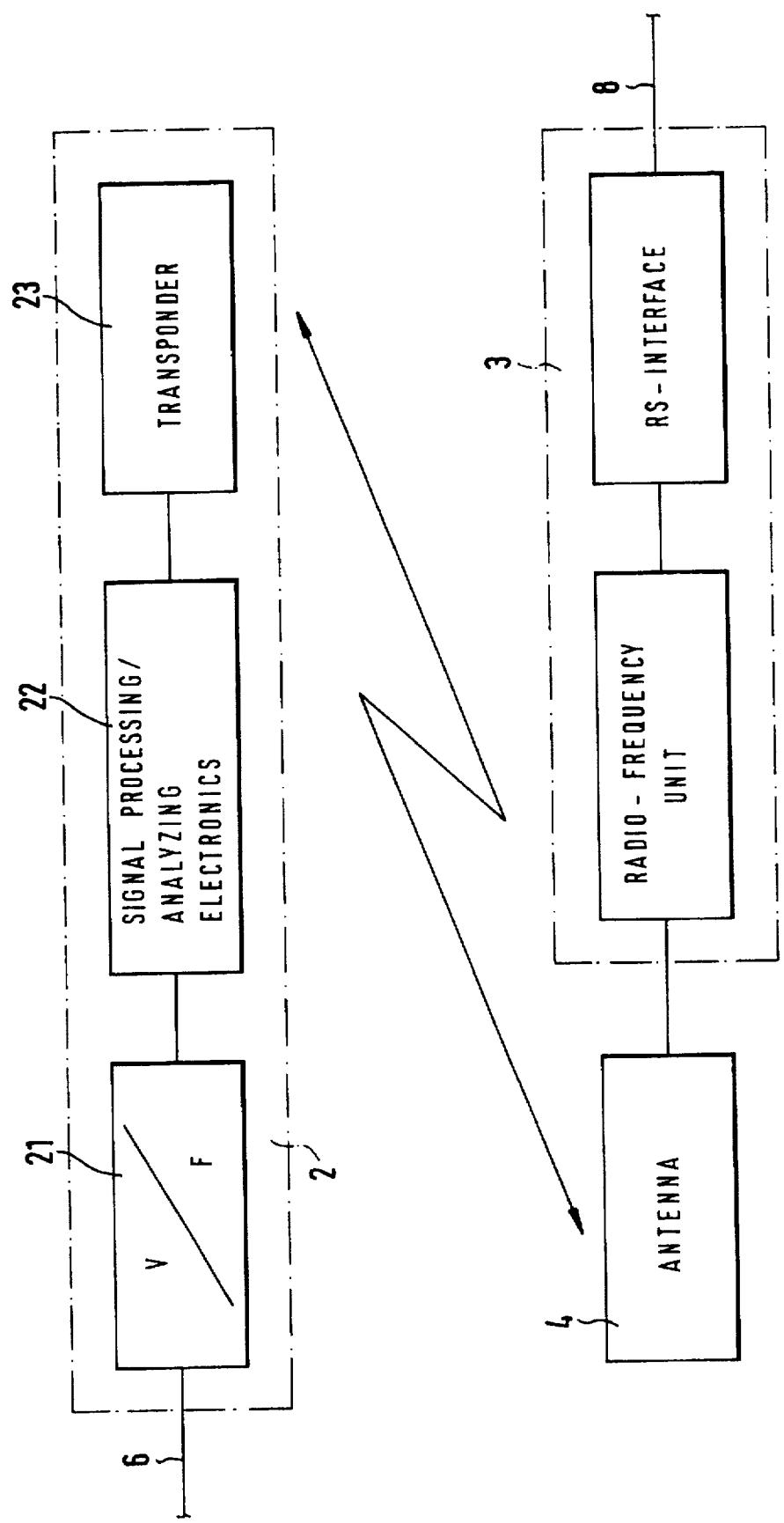
FIG. 5 is a schematic block-diagram illustration of the transfer of a measurement signal in the method and device in accordance with the present invention.

Measurement signals are passed from the detectors 5 along cables 6 to a unit 2 for reading the measurement of the detectors, referred to as a measurement signal reading unit. Unit 2 is fixed to the end of the roll near the roll axle 18. As shown in FIG. 5, the measurement signal reading unit 2 for reading the measurement signals generated by the detectors includes a voltage/frequency converter 21, through which signals representative of, e.g., the pressure measurements from the detectors are transferred further to the signal processing/analyzing electronics unit 22 integrated in the same unit 2. In the signal processing and analyzing electronics unit 22, the signal is modulated by means of a frequency modulator to FM-modulation into so-called FSK-modulated pulse form (FSK=Frequency Shift Keying). The signal, which has been converted to this form, is transferred further into the transponder 23, which is integrated in the same unit 2 and capable of processing the FSK-modulated pulse-formed signal. The transfer of the signal is constantly analogous, and it is at no stage converted to digital form. The analog signal is just converted to pulse form in the measurement signal reading unit 2 for reading the measurements from the detectors, in which case it is easy to filter off any interference so that the main frequency can be read.

The transponder 23 is of the read/write type and is arranged to both receive and transmit signals. From the transponder 23, the signal is transferred telemetrically to a transponder reading unit 3 by means of an antenna 4.

As shown in FIG. 4, the transponder reading unit 3 is attached to the frame 14 of the bearing housing of the roll 10. The antenna 4 may be attached to a face of the frame 14 of the bearing housing of the roll 10. In the telemetric signal transfer, a low transfer frequency is used, which is preferably of an order of about 130 kHz. The transponder reading unit 3 includes the electronics necessary for data transfer and, e.g., a frequency/voltage converter, by whose means the transferred signal is converted back to voltage form. The signal is converted to voltage form because the PC computer 7 can process such a voltage form. From the transponder reading unit 3, the signal is transmitted to the PC 7 along a cable 8, so that the distance from the transponder reading unit 3 to the PC 7 does not constitute a limiting factor in the system.

The transponder 23 is a commercially available component which has a very small size and low weight, and is manufactured and marketed, e.g., by Texas Instruments Corp. under the trade mark TIRIS. Such a transponder 23 can be coded so that it is possible to code (assign a code to) consisting of a number of several digits, e.g., 20 digits, for each detector 5. In such a case, the calibration of the detectors 5 can be carried out easily and simply, because the calibration of each detector 5 can be compared with the number coded in the transponder 23. Thus, the PC 7 does not have to contain a large and complex calibration program for the detectors 5.

It is another advantage of the present invention that the use of the system in accordance with the invention is very easy and simple, among other things, especially because of the fact that the transponder 23 can include a code of its own for each detector 5. Since both the measurement signal reading unit 2 for reading the measurements of the detectors and the transponder reading unit 3 are of the read/write type, from the PC 7, through the transponder reading unit 3, the transponder 23 can be given a command to read exclusively the detector 5 that has a certain code. In such a case, the PC 7 may include, e.g., a program that gives commands to read the detectors 5 in a certain sequence or at certain intervals. Two-way communications are thus provided.

The power consumption of the measurement electronics is very little, because the system is not active all the time. The system is, viz., not activated until a separate command is given for activation from the signal-receiving end (the reading unit or the control means coupled to the receiving unit). Thus, the current supply can be arranged by means of a very small battery having a corresponding low weight, and which can be fixed in a simple manner to the roll end in connection with, or at the vicinity of, the measurement signal reading unit 2 for reading and measurement of the detectors. The detectors 5 can be made favorably out of a PVDF-film (PVDF=polyvinylidenedifluoride), which is a piezoelectric film. The PVDF-film is well suitable for a power or pressure detector especially because, by means of such a film, with a force of just tens of newtons an output voltage of the volt level is already obtained. As the detectors, it is indeed also possible to use, e.g., strain gauges or other, corresponding detectors of this type that are commonly used.

Besides measuring pressures and forces, the system of the present invention can also be applied, e.g., to measure temperature at objects at which such information is needed. Some possible objects of this type of application are also, e.g., the headbox of a paper machine, in which the system can be used for measuring the uniformity of the lip profile. Further, the system can be applied, e.g., to monitoring the condition of bearings, in which case the measurement can be carried out, e.g., as measurement of the vibration level. The measurement system in accordance with the present invention can also be arranged to collect information constantly and at certain intervals. In such a case, when desired, it would be possible to look via the PC 7 what has happened in the object to be measured within a certain period of time. In such a case, the measurement system would operate in the way of a "black box".

Thus, in accordance with the invention, individual codes for each detector can be stored in the transponder and each of the detectors can be calibrated based on the stored individual codes. Moreover, during measurement operations, specific ones of the detectors can be identified by means of the individual codes so that measurements signals from the identified detector can be read and processed.

The examples provided above are not meant to be exclusive. Many other variations of the present invention would be obvious to those skilled in the art, and are contemplated to be within the scope of the appended claims.

I claim:

1. In a method for transferring measurement signals generated by detectors arranged on a revolving roll of a paper making machine to a first measurement signal reading unit and wirelessly transmitting said signals from said first measurement signal reading unit to a second reading unit situated exterior to the roll and associated with a control unit, the improvement comprising the steps of:

coupling a transponder to said first measurement signal reading unit, coupling said transponder to each of said detectors such that said transponder directs one of said detectors to generate a measurement signal upon receipt of a unique code assigned to said one of said detectors, reading analog measurement signals generated by said detectors by means of said first measurement signal reading unit, and transmitting said analog measurement signals from said first measurement signal reading unit at a frequency in the range of between about 100 kHz and about 150 kHz to said second reading unit.

2. The method of claim 1, further comprising the step of uniformly spacing said detectors in a transverse direction of the roll.

3. The method of claim 1, further comprising the step of arranged said first measurement signal reading unit at an end of the roll.

4. The method of claim 1, further comprising the step of converting said analog measurement signals to a pulse form in said first measurement signal reading unit, said measurement signals being transmitted by said transponder in pulse form.

5. The method of claim 1, wherein said measurement signals are transmitted by said transponder and are FSK-modulated signals.

6. The method of claim 1, further comprising the step of initiating measurement via said detectors by directing a command from said second reading unit to said transponder, the measurement unit otherwise remaining in a passive state.

7. The method of claim 1, further comprising the steps of storing the unique codes for each detector in said transponder, calibrating each detector based on the stored codes, and identifying specific ones of said detectors and reading measurements signals from the identified detector based on the stored codes.

8. The method of claim 1, further comprising the steps of forming a nip between the roll and an additional press roll, and measuring the distribution of the compression pressure in the nip in a machine direction thereof via said detectors.

9. The method of claim 1, further comprising the steps of forming a nip between the roll and an additional press roll, and measuring the distribution of the compression pressure in the nip in a transverse direction via said detectors.

10. The method of claim 1, wherein the frequency for the transfer of said measurements signals in pulse form from said first measurement signal reading unit to said second reading unit is about 130 kHz.

11. The method of claim 1, wherein said transponder is provided with one of the unique codes assigned to each of said detectors at each time to conduct individual measurements by means of said detectors.

12. A device for transferring measurement signals generated by detectors arranged on a revolving roll of a paper making machine to a first measurement signal reading unit and wirelessly transmitting said signals from said first measurement signal reading unit to a second reading unit situated exterior to the roll and associated with a control unit, comprising a transponder arranged in said first measurement signal reading unit, said transponder being coupled to each of said detectors and structured and arranged to direct one of said detectors to generate a measurement signal upon receipt of a unique code assigned to said one of said detectors, said transponder comprising means for transmitting said measurement signals in pulse form at a frequency in the range between about 100 kHz and about 150 kHz, said first measurement signal reading unit comprising means for processing said measurement signals received from said detectors as analog signals.

13. The device of claim 12, wherein said detectors are uniformly spaced in a transverse direction of the roll.

14. The device of claim 12, wherein said first measurement signal reading unit is arranged at an end of the roll.

15. The device of claim 12, wherein said detectors are activated by directing a command to said transponder via said second reading unit, said detectors otherwise being in a passive state.

16. The device of claim 12, wherein the unique codes of each of said detectors is used to calibrate said detectors and for identifying a specific detector to read the measurement signal generated by the specific detector.

17. The device of claim 12, wherein said first measurement signal reading unit further comprises means for converting said measurement signals in analog form generated by said detectors to a pulse form.

18. The device of claim 12, further comprising an antenna coupled to said second reading unit for receiving the wirelessly transmitted pulse form of said measurements signals from said transponder.

19. The device of claim 12, wherein the frequency of the transfer of said measurements signals in pulse form from said transponder to said second reading unit is about 130 kHz.

20. The device of claim 12, wherein said transponder is provided with one of the unique codes assigned to each of said detectors at each time to conduct individual measurements by means of said detectors.

* * * * *